(12) United States Patent
Paddick et al.

(10) Patent No.: US 11,789,210 B2
(45) Date of Patent: Oct. 17, 2023

(54) HYBRID OPTICAL POWER DISTRIBUTION BOX

(71) Applicant: Prysmian S.p.A., Milan (IT)

(72) Inventors: Nathan Paddick, Milan (IT); Kris Jonathan Roberts, Milan (IT)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 17/452,295

(22) Filed: Oct. 26, 2021

(65) Prior Publication Data

US 2022/0128769 A1 Apr. 28, 2022

(30) Foreign Application Priority Data

Oct. 28, 2020 (IT) .................. 102020000025582

(51) Int. Cl.
*G02B 6/36* (2006.01)
*H01B 9/00* (2006.01)

(52) U.S. Cl.
CPC .......... *G02B 6/3644* (2013.01); *H01B 9/005* (2013.01)

(58) Field of Classification Search
None
See application file for complete search history.

(56) References Cited

U.S. PATENT DOCUMENTS

| | | | |
|---|---|---|---|
| 5,947,765 A * | 9/1999 | Carlson, Jr. .......... | G02B 6/3897 439/535 |
| 7,220,144 B1 * | 5/2007 | Elliot ..................... | H01R 13/72 439/535 |
| 10,234,635 B1 | 3/2019 | Fabian et al. | |
| 2004/0029437 A1 * | 2/2004 | Caveney ............. | G02B 6/4441 439/535 |

(Continued)

FOREIGN PATENT DOCUMENTS

WO 2018200528 A1 11/2018
WO 2019147774 A1 8/2019

*Primary Examiner* — Chad H Smith
(74) *Attorney, Agent, or Firm* — Slater Matsil, LLP

(57) ABSTRACT

A hybrid optical power distribution box comprises a wall and one or more apertures in the wall, each aperture having a receiving area, one or more optical adapters for optical connectors, the optical adapters being attached to the hybrid optical power distribution box, each optical adapter extending along an optical direction between a first optical portion configured to be connected to an optical connector and a second optical portion inside the hybrid optical power distribution box, each second optical portion having an optical cross-sectional area configured to be inserted inside an aperture; one or more power adapters for electrical power connectors, the power adapters being attached to the hybrid optical power distribution box, each power adapter extending along a power direction between a first power portion configured to be connected to a power connector and a second power portion inside the hybrid optical power distribution box, each second power portion having a power (Continued)

cross-sectional area configured to be inserted inside an aperture. The optical cross-sectional area of the optical adapters matches with the power cross-sectional area of the power adapters and the receiving area of the apertures is configured to match with the optical cross-sectional area of the optical adapters and with the power cross-sectional area of the power adapters.

18 Claims, 5 Drawing Sheets

(56) References Cited

U.S. PATENT DOCUMENTS

| | | | |
|---|---|---|---|
| 2009/0175580 A1* | 7/2009 | Chen ................... | G02B 6/3817 |
| | | | 385/75 |
| 2015/0378122 A1 | 12/2015 | Simmons | |
| 2020/0088964 A1* | 3/2020 | Desard ................. | H02G 15/013 |
| 2021/0104842 A1* | 4/2021 | Keith ................... | H01R 13/64 |

* cited by examiner

HYBRID OPTICAL POWER DISTRIBUTION BOX

CROSS-REFERENCE TO RELATED APPLICATIONS

This application claims priority to Italian Patent Application No. 102020000025582, filed on Oct. 28, 2020, which application is hereby incorporated herein by reference.

TECHNICAL FIELD

The present invention relates to the field of equipment and components for the installation optical adapters and power adapters for optical and power connection to a distribution box. In particular, the present invention relates to a hybrid optical power distribution box.

BACKGROUND

Typically, optical adapters such as SC simplex, LC duplex or MPO have standard footprint which allow any adapters to be used in relative standard apertures in a distribution box. Specifically, the optical adapters can be interchangeably inserted into the apertures formed in the wall of the distribution box because of their standard footprint.

On the other side, power adapters have different dimensions and footprints that need specific apertures and connections to a distribution box which makes them less versatile. Furthermore, the distribution box for optical and power connections uses complex and expensive hybrid connectors for making optical and power connections.

U.S. Pat. No. 10,234,635 discloses a connector comprising a shell acing a cavity configured to receive a single conventional insert and one or more modular inserts wherein each modular insert has a form factor ½ to ¼ of the form factor of said conventional insert, such that said cavity is capable of receiving 2 to 4 said modular inserts. Each modular insert has at least: (i) a housing having a front opening and a rear opening, (ii) an interface disposed in said front opening, said interface presenting one or more conductors, said conductors extending from said interface rearward through said rear opening and into a jacketed cable, (iii) a crimp portion rearward of said rear opening, said jacketed cable being secured to said crimp portion, and (iv) one or more seals sealing said front and rear opening such that said interior of said housing is sealed from environment.

WO2018/200528A1 discloses a family of connectors to accommodate a single twisted pair of conductors is disclosed herein. The family of connectors includes a free connector, a fixed connector, and an adapter; the free and/or fixed connectors can be modified to accommodate the adapter configuration and/or modified to accommodate various patch cord configurations. In certain embodiments, the one or more of the family of connectors adopts an LC fiber optic style connector configuration and an LC fiber optic footprint configuration. In certain examples, one or more of the family of connectors adopts an LC fiber optic style connector configuration but in a footprint that is larger or smaller than the footprint of the LC fiber optic footprint. Other configurations may also be adopted.

WO2019/147774A1 discloses a family of connectors includes a plug, receptacle and adapter with the plug incorporating beam contacts, and the receptacle and adapter incorporating interfacing arched beam contacts. A z-configuration of the port(s) within the receptacle and adapter is configured to interface with the plug, which also presents a z-configuration. The parallel, upper and lower portions of the z-configuration of the plug incorporate the beam contacts. The first beam contact of the plug is rotated 180 degrees from the second beam contact of the plug; the arched beam contacts are similarly rotated. The plug, receptacle and adapter of a small form factor that is similar or identical to the formal factor of an optical fiber LC connector. The plug and receptacle can be configured for circuit board, cable or patch cord mounting. The plug and receptacle can be utilized in a multi-plug/multi-receptacle configuration.

The above mentioned prior art documents disclose devices/systems able to receive a plurality of modules in a single cavity or single twisted pairs for data communication in connectors having footprint of optical LC connectors. Therefore, such devices/systems make the relative connections between the adapters and the apertures complex and limit to specific dimensions of the adapters.

SUMMARY

The applicant has tackled the problem of providing a hybrid optical power distribution box able to receive and retain interchangeably power adapters and optical adapters into the apertures of the hybrid optical power distribution box formed on the relative wall.

The Applicant has found that providing optical adapters and power adapters having respective optical cross-sectional areas and power cross-sectional areas of the portion to be inserted into the apertures that mutually match and match with the receiving area of the apertures, allows to make versatile and simple the hybrid optical power distribution box.

Therefore, the present invention relates to a hybrid optical power distribution box comprising: a wall and one or more apertures in the wall, each aperture having a receiving area, one or more optical adapters for optical connectors, the optical adapters being attached to the hybrid optical power distribution box, each optical adapter extending along an optical direction between a first optical portion configured to be connected to an optical connector and a second optical portion inside the hybrid optical power distribution box, each second optical portion having an optical cross-sectional area configured to be inserted inside an aperture; one or more power adapters for electrical power connectors, the power adapters being attached to the hybrid optical power distribution box, each power adapter extending along a power direction between a first power portion configured to be connected to a power connector and a second power portion inside the hybrid optical power distribution box, each second power portion having a power cross-sectional area configured to be inserted inside an aperture; the optical cross-sectional area of the optical adapters matches with the power cross-sectional area of the power adapters; the receiving area of the apertures is configured to match with the optical cross-sectional area of the optical adapters and with the power cross-sectional area of the power adapters, thereby the optical adapters and the power adapters being interchangeably attachable to each aperture of the hybrid optical power distribution box.

According to one embodiment, the optical cross-sectional area is defined as an area of a cross section of the second optical portion along the optical direction, the power cross-sectional area is defined as an area of the cross section of the second power portion along the power direction.

According to one embodiment, the optical cross-sectional area and the power cross-sectional area are between 115 to 125 mm² or between 235 to 245 mm².

According to one embodiment, the power adapter comprises retaining members for attaching the power adapter to the hybrid optical power distribution box, each retaining member cooperating with the hybrid optical power distribution box.

According to one embodiment, the second power portion comprises a hollow body having an inner cavity; the power adapter comprises at least two passing through channels connecting the first power portion with the inner cavity.

According to one embodiment, the power adapter comprises at least two tubes extending from the first power portion along the power direction and joining with the at least two passing through channels.

According to one embodiment, the power adapter comprises at least two pins arranged into the at least two passing through channels and configured to be clamped to conductive wires and to be coupled with a power connector.

According to one embodiment, the power adapter is formed of a one piece polymer body, and includes conductive members for electrical connection.

According to one embodiment, the power adapter is configured to provide connections for at least two conductive wires having 24 to 4 AWG and 0.25-25 mm².

According to one embodiment, the optical adapter is an LC Duplex or SC Simplex.

The present invention will now be described in more detail hereinafter with reference to the accompanying drawings, in which some embodiments of the invention are shown.

BRIEF DESCRIPTION OF THE DRAWINGS

The present invention will now be described in more detail hereinafter with reference to the accompanying drawings, in which some embodiments of the invention are shown.

DETAILED DESCRIPTION OF ILLUSTRATIVE EMBODIMENTS

Figure 1:
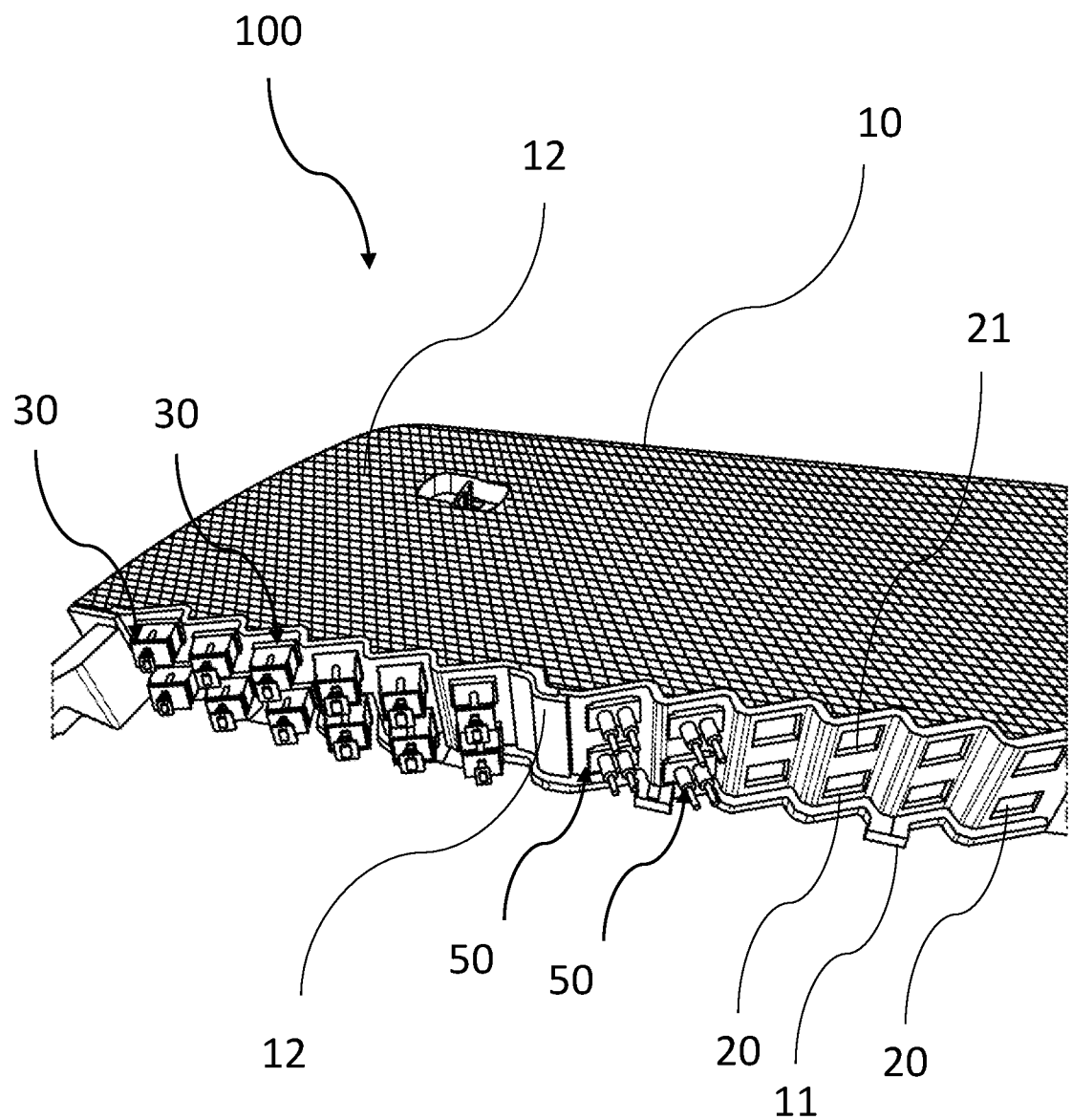
FIG. 1 is a perspective view of a hybrid optical power distribution box according to a first embodiment of the present invention.
Figure 2:
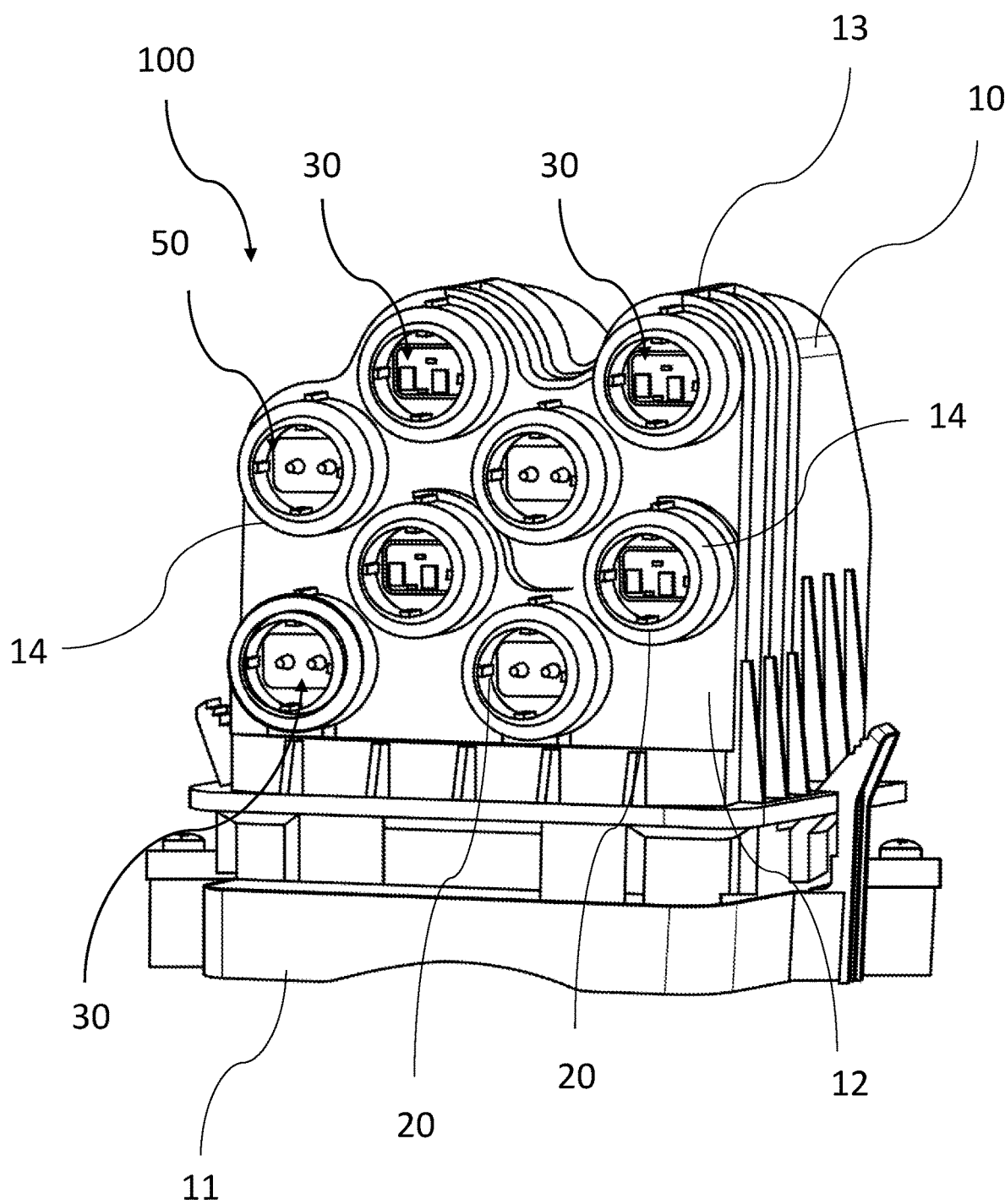
FIG. 2 is a perspective view of the hybrid optical power distribution box according to a second embodiment of the present invention.

FIGS. 1 and 2 show a hybrid optical power distribution box 100 able to receive and retain one or more optical connectors and power connectors (not shown).

The hybrid optical power distribution box 100 comprises a wall 10 and one or more apertures 20 formed in the wall 10. Each aperture 20 has a receiving area 21.

Preferably, the hybrid optical power distribution box 100 comprises a base 11, a sidewall 12 and a cover 13. More preferably, the sidewall 12 is the wall 10 in which the apertures 20 are formed. It is to be noted that the wall 10 delimits an internal volume wherein optical and power connector are arranged.

The hybrid optical power distribution box 100 comprises optical adapters 30 for optical connectors and power adapters 50 for power connectors. Preferably, each aperture 20 allows the insertion of a portion of the optical adapters 30 and power adapters 50 such that the opposed portion can be coupled with the respective optical connector and power connector.

According to the embodiment shown in FIG. 1, each aperture 20 is flush with the wall 10. Alternatively, in the embodiment shown in FIG. 2, the wall 10 comprises a insertion channel 14 associated to each aperture 20 and configured to house at least a portion of the optical adapters 30 and power adapters 50.

According to one embodiment, the hybrid optical power distribution box 100 comprises receiving members, not shown, configured to receive and retain the optical adapters 30 and the power adapters 50. Preferably, the receiving members are associated to each aperture 20 such that the optical adapters 30 and the power adapters 50 protrude from the relative aperture 20 or are flush with the wall 10. According to the embodiment shown in FIG. 2, the optical adapters 30 and the power adapters 50 protrude at least partially inside the insertion channels 14.

The power adapters 50 are attached to the hybrid optical power distribution box 100.

Specifically, each power adapter 50 extends along a power direction B-B between a first power portion 51 and a second power portion 52. The first power portion 51 is configured to be connected to a power connector and the second power portion 52 is configured to be inserted inside the hybrid optical power distribution box 100.

Preferably, the second power portion 52 is configured to be inserted inside an aperture 20. More preferably, the receiving members of the hybrid optical power distribution box 100 retain the second power portion 52 of the optical portion attached to the hybrid optical power distribution box 100.

Each second power portion 52 has a power cross-sectional area 60 configured to be inserted inside an aperture 20. Preferably, the power cross-sectional area 60 is defined as an area of a cross section of the second power portion 52 along the power direction B-B. In detail, each cross section of the second power portion 52 has an outer perimeter which delimits a power cross-sectional area 60. The second power portion 52 has therefore a power footprint retainable inside the hybrid optical power distribution box 100.

According to one embodiment, the power adapter 50 comprises retaining members 70 for attaching the power adapter 50 to the hybrid optical power distribution box 100. Preferably, each retaining member 70 cooperates with the hybrid optical power distribution box 100 to attach the relative power adapter 50 to the hybrid optical power distribution box 100. More preferably, the retaining member 70 cooperates with the receiving member to removably attach the power adapter 50 to the hybrid optical power distribution box 100.

Figure 3:
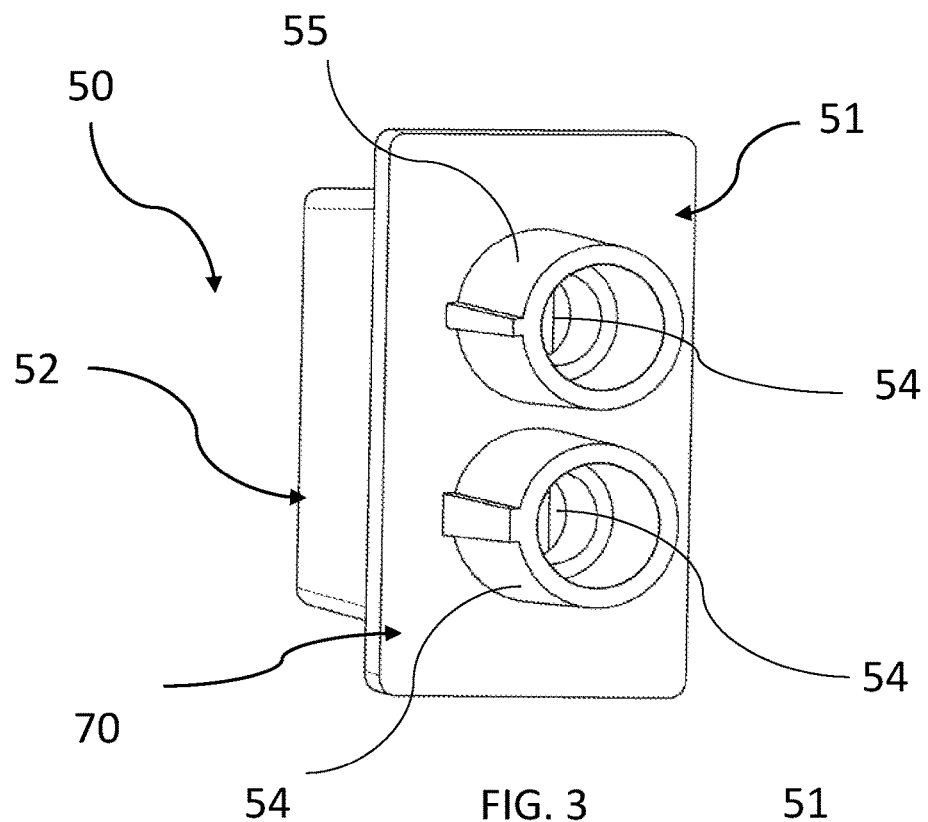
FIG. 3 is a first perspective view of a power adapter according to an embodiment of the present invention.
Figure 4:
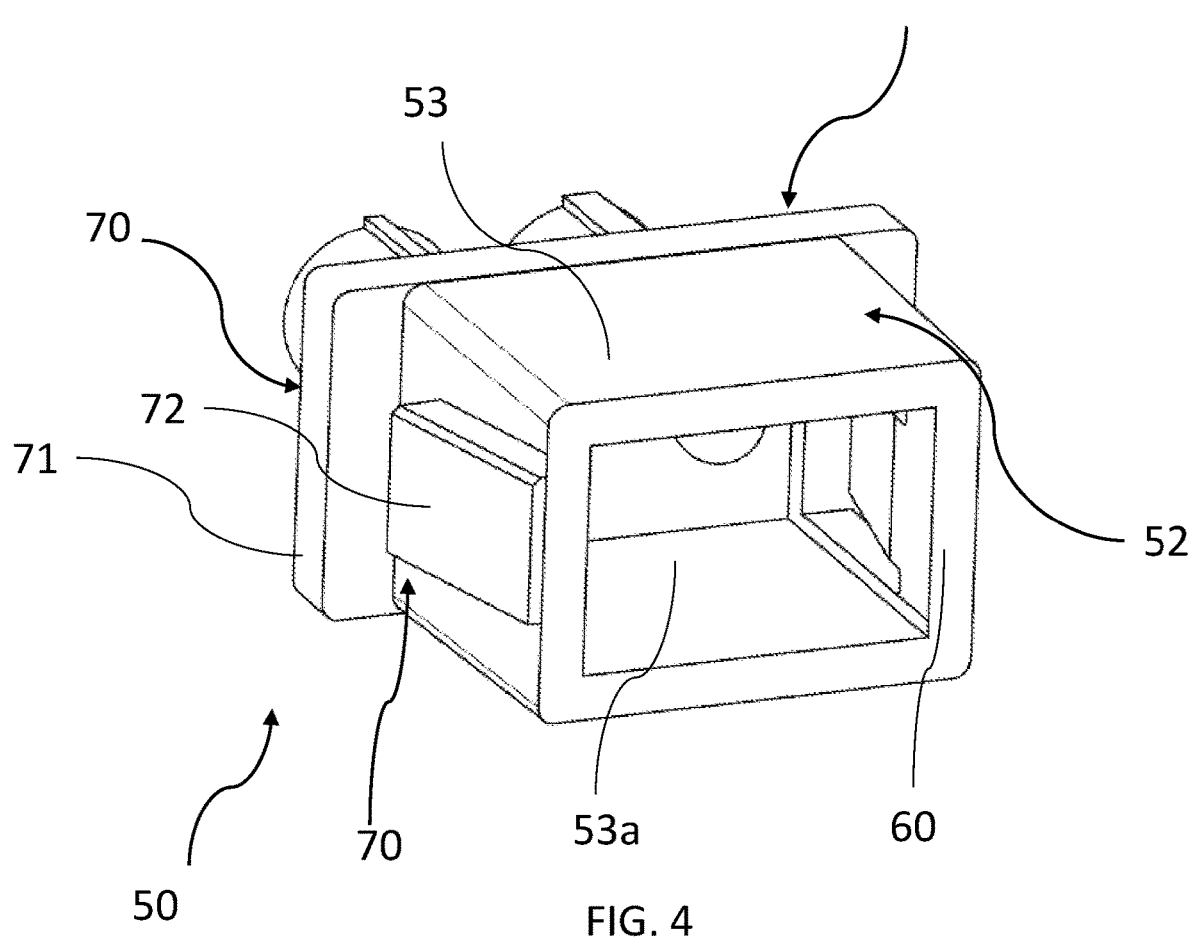
FIG. 4 is a second perspective view of the power adapter of FIG. 3.
Figure 5:
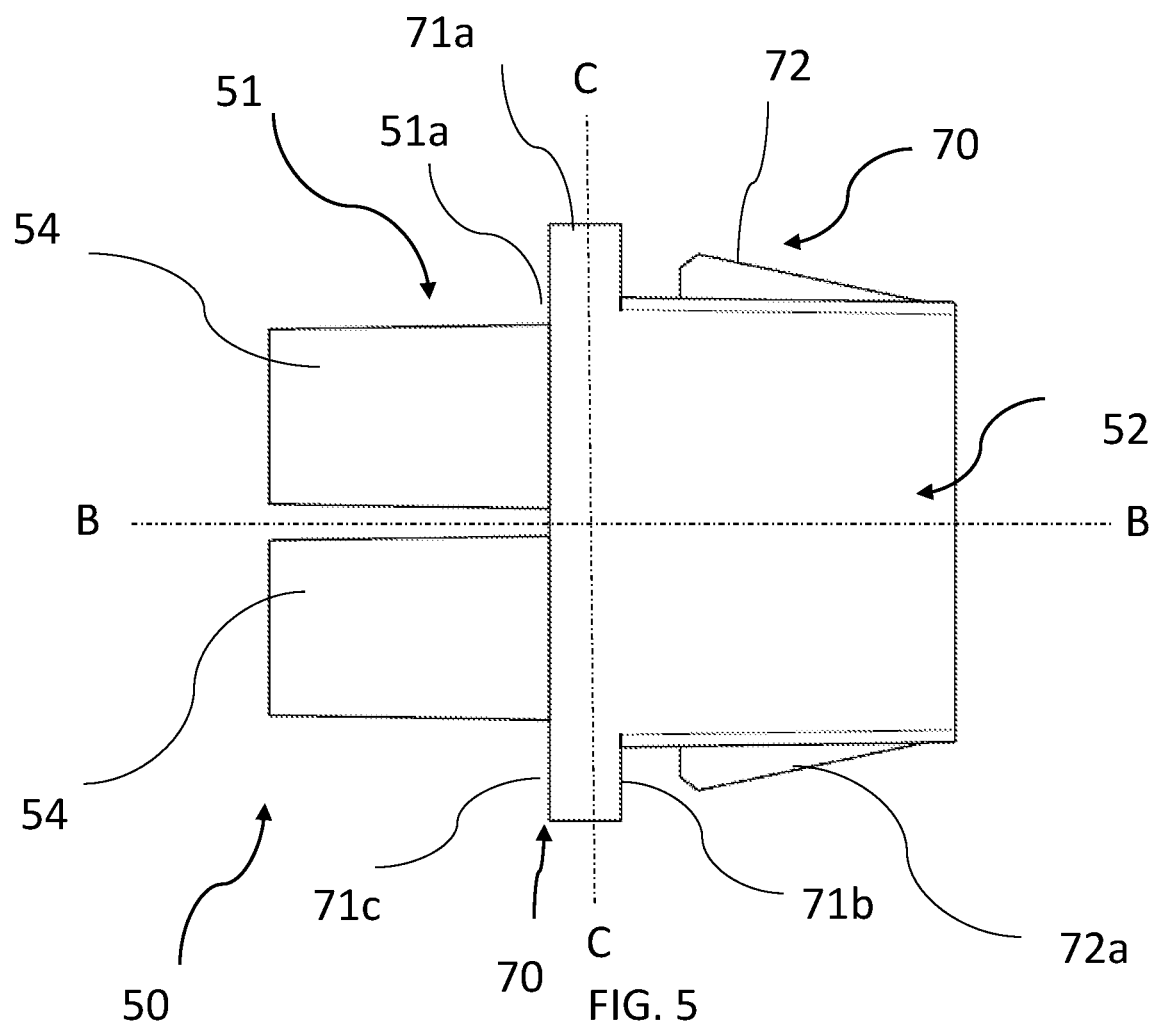
FIG. 5 is a side view of the power adapter of FIG. 3.
Figure 6:
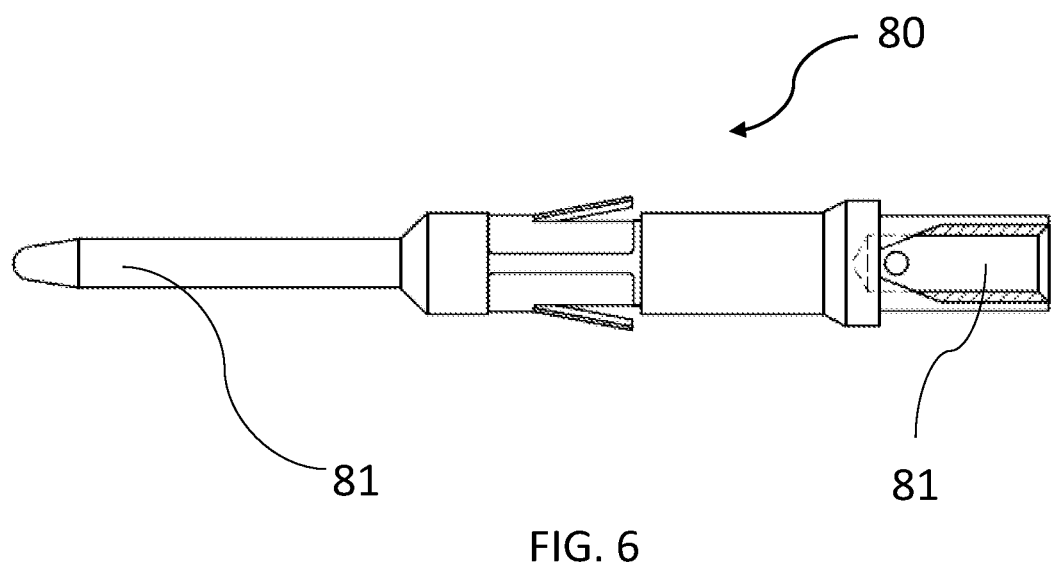
FIG. 6 is a side view of a component of the power adapter of FIG. 3
Figure 7:
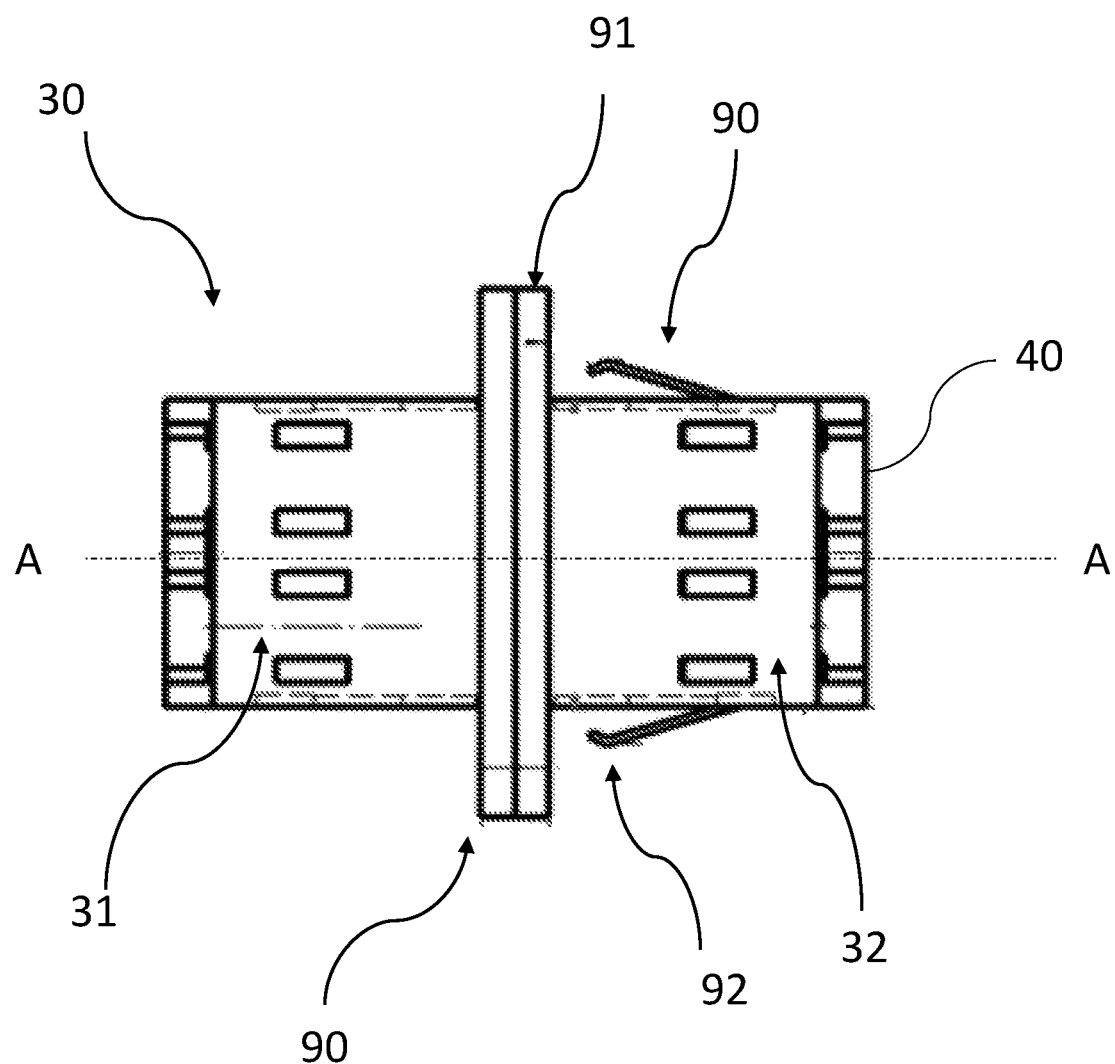
FIG. 7 is a side view of an optical adapter according to an embodiment of the present invention.

According to the embodiment shown in FIGS. 3-5, the retaining member 70 comprises a first retaining element 71 and a second retaining element 72. The first retaining element 71 cooperates with the wall 10 to prevent mutual movement of the power adapter 50 relative to the wall 10 to inside the aperture 20. Preferably, the first retaining element 71 comprises a flange 71a having an inner surface 71b faced to the wall 10 and an opposed outer surface 71c. In detail, the flange 71a abuts against the wall 10 around the aperture 20 where a power adapter 50 is inserted. The second retaining element 72 cooperates with the wall 10 to prevent movement of the power adapter 50 away from the aperture 20. Specifically, the second retaining element 72 is coupled with the receiving members to retain the power adapters. Preferably, the second retaining element 72 has at least two elastic wings 72a. The two elastic wings 72 are configured to elastically deform upon insertion of the second power adapter 50 in the aperture 20 to attach the power adapter 50 to the hybrid optical power distribution box 100.

More preferably, the flange 71a and the two wings 72a cooperate with the wall 10 to retain the optical adapters 50. Preferably, the flange 71a abuts against the wall 10 outside hybrid optical power distribution box 100 and at least a portion of two wings 72a abuts against the wall 10 inside the hybrid optical power distribution box 100.

According to one embodiment, the second power portion 52 comprises a hollow body 53 having an inner cavity 53a. Preferably, the inner cavity 53a is configured to receive power connector arranged inside the hybrid optical power distribution box 100.

As shown in FIGS. 3-5, the power adapter 50 comprises at least two passing through channels 54 connecting the first power portion 51 with the inner cavity 53a. In particular, the passing through channels 54 are configured to put in power communication the power connector inside the hybrid optical power distribution box 100 with the power connectors attached to the power adapters 50 outside the hybrid optical power distribution box 100.

According to one embodiment, the power adapter 50 comprises at least two tubes 55 extending from the first power portion 51 along the power direction B-B. The two tubes 55 are joined with the two passing through channels 54.

Preferably, the first power portion 51 comprises a support wall 51a extending from the first power portion 51. The support wall 51a defines the first retaining element 71 and the flange 71a protruding along a direction C-C perpendicular to the power direction B-B. More preferably, the support wall 51a has the two passing through channel 54 which connect the outer surface 71c with the inner cavity 53a. Specifically, the tubes 55 extend from the support wall 51a at the outer surface 71c.

According to one embodiment, the power adapter 50 comprises at least two pins 80 arranged into the at least two passing through channels 54. Preferably, the pins 80 extends between a first end portion 81 and second end portion 82. Preferably, the first end portion 81 is configured to be inserted into a power connector and the second end portion 82 is configured to receive a power connector. In detail, the first end portion 81 defines a "male" portion of the power adapter 50 and the second end portion 82 defines "female" portion of the power adapter 50. In particular, the pins 80 are configured to be clamped to conductive wires and to be coupled with a power connector. In details, the power adapter 50 is configured to provide connections for at least two conductive wires having 24 to 4 AWG and 0.25-25 mm². It is to be noted that the conductive wires are associated to the power connector.

More preferably, the pins 80 are retained at the support wall and extend at least partially in the tubes 55 and in the inner cavity 53a.

According to one embodiment, the power adapter 50 is formed of a one piece polymer body, with additional conductive parts for electrical connection, for example the two pins 80.

The optical adapters 30 are attached to the hybrid optical power distribution box 100.

Each optical adapter 30 extends along an optical direction A-A between a first optical portion 31 and a second optical portion 32. The first optical portion 31 is configured to be connected to a relative optical connector and the second optical portion 32 is configured to be inserted inside the hybrid optical power distribution box 100.

Preferably, the second optical portion 32 is configured to be inserted inside an aperture 20. More preferably, the receiving members are configured to retain the second optical portion 32 to the hybrid optical power distribution box 100.

Each second optical portion 32 has an optical cross-sectional area 40 configured to be inserted inside an aperture 20. Preferably, the optical cross-sectional area 40 is defined as an area of a cross section of the second optical portion 32 along the power direction A-A. In detail, each cross section of the second optical portion 52 has an outer perimeter which delimits an optical cross-sectional area 40. The second optical portion 32 has therefore an optical footprint retainable inside the hybrid optical power distribution box 100.

According to one embodiment, the optical adapter 30 comprises retaining members 90 for attaching the optical adapter 30 to the hybrid optical power distribution box 100. Preferably, each retaining member 90 cooperates with the hybrid optical power distribution box 100 to attach the relative optical adapter 30 to the hybrid optical power distribution box 100. More preferably, the retaining members 90 cooperates with the receiving member to removably attach the optical adapter 30 to the hybrid optical power distribution box 100.

It is to be noted that the retaining members 90 are substantially the same as the first retaining members 70. As a matter of fact, the retaining member 90 comprises a first retaining element 91 and a second retaining element 92. The first retaining element 91 cooperates with the wall 10 to prevent mutual movement of the optical adapter 30 relative to the wall 10 inside the aperture 20. The second retaining element 92 cooperates with the wall 10 to prevent movement of the optical adapter 30 away from the aperture 20. Specifically, the second retaining element 92 is coupled with the receiving members to retain the optical adapters.

According to one embodiment, the optical adapter 30 is an LC Duplex, SC Simplex, MPO, LC Quad or SC Duplex. In some embodiments the hybrid optical power distribution box comprises combinations of different optical adapters.

According to the preferred embodiment, the optical cross-sectional area 40 of the optical adapters 30 matches with the power cross-sectional area 60 of the power adapters 50. Furthermore, the receiving area 21 of the apertures 20 is configured to match with the optical cross-sectional area 40 of the optical adapters 30 and with the power cross-sectional area 60 of the power adapters 50.

Thanks to the matching between the optical cross-sectional areas 40, the power cross-sectional areas 60 and the receiving area 21, the optical adapters 30 and the power adapters 50 are interchangeably attachable to the hybrid optical power distribution box 100.

Preferably, the second optical portion 32 and the second power portion 52 are insertable inside any aperture 20 of the hybrid optical power distribution box 100. More preferably, the receiving members retain both the optical adapters 30 and the power adapters 50.

In detail, the optical footprint matches with the power footprint such that the optical adapters 30 and the power adapters 50 are insertable inside any aperture 20.

According to one embodiment, the optical cross-sectional area 40 and the power cross-sectional area 60 are between 115 to 125 mm2 or between 235 to 245 mm2. It is to be noted that the optical cross-sectional area 40 and the power cross-sectional area 60 are equal to the relative cross-sectional area of respectively the standard LC Duplex SC Simplex, and MPO with SC footprint, or with the standard LC Quad and SC duplex optical adapters.

What is claimed is:

1. A hybrid optical power distribution box comprising:
   a wall and one or more apertures in the wall, each aperture having a receiving area,
   one or more power adapters for electrical power connectors, the power adapters being attached to the hybrid optical power distribution box, each power adapter extending along a power direction between a first power portion configured to be connected to a power connector and a second power portion inside the hybrid optical power distribution box, each second power portion having a power cross-sectional area configured to be inserted inside an aperture, wherein the second power portion comprises a hollow body having an inner cavity, and each of the power adapters comprise at least two passing through channels connecting the first power portion with the inner cavity; and
   one or more optical adapters for optical connectors, the optical adapters being attached to the hybrid optical power distribution box, each optical adapter extending along an optical direction between a first optical portion configured to be connected to an optical connector and a second optical portion inside the hybrid optical power distribution box, each second optical portion having an optical cross-sectional area configured to be inserted inside an aperture,
   wherein:
      the optical cross-sectional area of the optical adapters matches with the power cross-sectional area of the power adapters; and
      the receiving area of the apertures is configured to match with the optical cross-sectional area of the optical adapters and with the power cross-sectional area of the power adapters, wherein the optical adapters and the power adapters are interchangeably attachable to each aperture of the hybrid optical power distribution box.

2. The hybrid optical power distribution box according to claim 1, wherein:
   the optical cross-sectional area is defined as an area of a cross section of the second optical portion along the optical direction, and
   the power cross-sectional area is defined as an area of the cross section of the second power portion along the power direction.

3. The hybrid optical power distribution box according to claim 1, wherein the optical cross-sectional area and the power cross-sectional area are between 115 to 125 mm$^2$ or between 235 to 245 mm$^2$.

4. The hybrid optical power distribution box according to claim 1, wherein:
   the power adapter comprises retaining members for attaching the power adapter to the hybrid optical power distribution box, each retaining member cooperating with the hybrid optical power distribution box.

5. The hybrid optical power distribution box according to claim 1, wherein the power adapter comprises at least two tubes extending from the first power portion along the power direction and joining with the at least two passing through channels.

6. The hybrid optical power distribution box according to claim 1, wherein the power adapter comprises at least two pins arranged into the at least two passing through channels and configured to be clamped to conductive wires and to be coupled with a power connector.

7. The hybrid optical power distribution box according to claim 1, wherein the power adapter is formed of a one piece polymer body and includes conductive members for electrical connection.

8. The hybrid optical power distribution box according to claim 1, wherein the power adapter is configured to provide connections for at least two conductive wires having 24 to 4 AWG, the at least two conductive wires having a cross-sectional area of 0.25-25 mm$^2$.

9. The hybrid optical power distribution box according to claim 1, wherein the optical adapter is an LC Duplex, SC Simplex, LC Quad, SC Duplex, or MPO.

10. A hybrid optical power distribution box comprising:
    one or more apertures in a wall, each aperture having a receiving area,
    one or more first adapters, the first adapters being configured to carry only power, the first adapters being attached to the hybrid optical power distribution box, each first adapter extending along a first direction between a first power portion configured to be connected to a power connector and a second power portion inside the hybrid optical power distribution box, each second power portion having a first cross-sectional area configured to be inserted inside one of the one or more apertures, wherein the second power portion comprises a hollow body having an inner cavity, and each of the first adapters comprise at least two passing through channels connecting the first power portion with the inner cavity; and
    one or more second adapters, the second adapters being configured to carry only optical signals, the second adapters being attached to the hybrid optical power distribution box, each second adapter extending along a second direction between a first optical portion configured to be connected to an optical connector and a second optical portion inside the hybrid optical power distribution box, each second optical portion having a second cross-sectional area configured to be inserted inside one of the one or more apertures,
    wherein:
       the first cross-sectional area of the first adapters and the second cross-sectional area of the second adapters are the same; and
       the receiving area of the apertures is configured to match with the first cross-sectional area of the first adapters and with the second cross-sectional area of the second adapters, wherein the first adapters and the second adapters are interchangeably attachable with any aperture of the hybrid optical power distribution box.

11. The hybrid optical power distribution box according to claim 10, wherein each of the one or more first adapters is formed of a one piece polymer body and includes conductive members for electrical connection.

12. The hybrid optical power distribution box according to claim 10, wherein each of the one or more first adapters is configured to provide connections for at least two conductive wires having 24 to 4 AWG, the at least two conductive wires having a cross-sectional area of 0.25-25 mm².

13. The hybrid optical power distribution box according to claim 10, wherein the second adapter is an LC Duplex, SC Simplex, LC Quad, SC Duplex, or MPO.

14. A hybrid optical power distribution box comprising:
one or more apertures in a wall, each aperture having a receiving area,
one or more first adapters, the first adapters being configured to carry only power, the first adapters being attached to the hybrid optical power distribution box, each first adapter extending along a first direction between a first power portion configured to be connected to a power connector and a second power portion inside the hybrid optical power distribution box, each second power portion having a first cross-sectional area configured to be inserted inside one of the one or more apertures, the one or more first adapters comprising retaining members for attaching the respective one of the first adapters to the hybrid optical power distribution box, each retaining member cooperating with the hybrid optical power distribution box, wherein the second power portion comprises a hollow body having an inner cavity, and each of the first adapters comprise at least two passing through channels connecting the first power portion with the inner cavity; and
one or more second adapters, the second adapters being configured to carry only optical signals, the second adapters being attached to the hybrid optical power distribution box, each second adapter extending along a second direction between a first optical portion configured to be connected to an optical connector and a second optical portion inside the hybrid optical power distribution box, each second optical portion having a second cross-sectional area configured to be inserted inside one of the one or more apertures;
wherein the first cross-sectional area of the first adapters and the second cross-sectional area of the second adapters are the same, and
wherein the receiving area of the apertures is configured to match with the first cross-sectional area of the first adapters and with the second cross-sectional area of the second adapters, and wherein the first adapters and the second adapters are interchangeably attachable with any aperture of the hybrid optical power distribution box.

15. The hybrid optical power distribution box according to claim 14, wherein the one or more first adapters comprise at least two tubes extending from the first power portion along the first direction and joining with the at least two passing through channels.

16. The hybrid optical power distribution box according to claim 14, wherein the one or more first adapters comprise at least two pins arranged into the at least two passing through channels and configured to be clamped to conductive wires and to be coupled with the power connector.

17. The hybrid optical power distribution box according to claim 14, wherein each of the one or more first adapters is formed of a one piece polymer body and includes conductive members for electrical connection.

18. The hybrid optical power distribution box according to claim 14, wherein each of the one or more first adapters is configured to provide connections for at least two conductive wires having 24 to 4 AWG, the at least two conductive wires having a cross-sectional area of 0.25-25 mm², and wherein each of the one or more second adapters is an LC Duplex, SC Simplex, LC Quad, SC Duplex, or MPO.

* * * * *